United States Patent
Kumar et al.

(10) Patent No.: US 6,586,930 B1
(45) Date of Patent: Jul. 1, 2003

(54) MATERIAL THICKNESS MEASUREMENT USING MAGNETIC INFORMATION

(75) Inventors: Sankaran Kumar, San Marcos, CA (US); William Frank Avrin, San Diego, CA (US); Hoke Smith Trammell, III, San Diego, CA (US); Suresh Meempat Menon, San Diego, CA (US)

(73) Assignee: Quantum Magnetics, Inc., San Diego, CA (US)

( * ) Notice: Subject to any disclaimer, the term of this patent is extended or adjusted under 35 U.S.C. 154(b) by 0 days.

(21) Appl. No.: 09/560,467

(22) Filed: Apr. 28, 2000

(51) Int. Cl.[7] .......................... G01B 7/06; G01N 22/72; G01R 33/12
(52) U.S. Cl. .................. 324/225; 324/229; 324/231
(58) Field of Search ................. 324/225, 228, 324/229–231, 239, 240

(56) References Cited

U.S. PATENT DOCUMENTS

| 5,200,704 A | * | 4/1993 | Clark, Jr. et al. ............ 324/326 |
| 5,373,235 A | * | 12/1994 | Clark, Jr. et al. ......... 324/207.16 |
| 5,467,014 A | | 11/1995 | Nix .............................. 324/230 |
| 5,539,675 A | | 7/1996 | Carroll, Sr. et al. ......... 364/560 |
| 5,541,510 A | * | 7/1996 | Danielson .................... 324/233 |
| 5,722,285 A | * | 3/1998 | Tsuchiya et al. ............... 73/159 |
| 5,770,949 A | | 6/1998 | Sgro ............................ 324/229 |
| 5,963,031 A | | 10/1999 | De Halleux et al. ......... 324/230 |

FOREIGN PATENT DOCUMENTS

JP          52-45953       *   4/1977

* cited by examiner

Primary Examiner—Edward Lefkowitz
Assistant Examiner—Reena Aurora
(74) Attorney, Agent, or Firm—The Maxham Firm

(57) ABSTRACT

An apparatus for and a method of measuring material thickness with magnetics. The thickness monitoring system includes a thickness monitor, a probe, and a target. In a preferred embodiment, the probe is positioned on one side of an article for which the thickness is to be determined. The target is positioned on the opposite side of the article from the probe. The probe includes an excitation coil, a field compensation coil, and a magnetic sensor. The method includes energizing the excitation coil to excite a response from the target, compensating for the effect of the excitation coil on the magnetic sensor, measuring the response of the target with the magnetic sensor, and determining the thickness of the article from the measured response. The preferred mode of energizing the excitation coil is with an AC waveform; however DC, multi-frequency AC, or a combination of AC and DC waveforms may be used.

38 Claims, 3 Drawing Sheets

MATERIAL THICKNESS MEASUREMENT USING MAGNETIC INFORMATION

BACKGROUND OF THE INVENTION

1. Field of the Invention

The present invention relates generally to the field of automated measuring devices and pertains more specifically to an apparatus for and a method of measuring material thickness using a magnetic technique.

2. Discussion of the Prior Art

There currently exist a number of techniques to measure the thickness of an object. Common techniques include (a) mechanical measurement, (b) ultrasound measurement, and (c) magnetic measurement. A mechanical measurement is usually performed using a mechanical instrument such as a pair of calipers. While the mechanical measurement can give accurate results, it is awkward, tedious, and time consuming to measure the thickness of large objects or objects with a complicated geometry. While ultrasound measurements can measure the thickness of many materials, it is difficult to use ultrasound to measure the thickness of materials which are inhomogeneous, such as composite materials, or those which have internal structures that can scatter ultrasound, such as honeycomb structures.

Magnetic thickness measurement can be divided into different categories. One type of magnetic measurement is the DC magnetic measurement. In a DC magnetic thickness measurement, a magnet is placed on one surface of the sample and the resultant magnetic field is measured at the opposite surface of the sample, using a magnetic field sensor such as a Hall sensor. Since the magnetic field falls with distance from the magnet, the thickness of the sample can be deduced from the magnitude of the measured magnetic field. Alternatively, both the magnet and the magnetic sensor are placed on the same surface of the sample, and the sample thickness is determined by measuring the response from a magnetically permeable target placed on the opposite surface of the sample. One example of a DC magnetic thickness measurement is described in U.S. Pat. No. 5,539,675 to Carroll Sr. et al. This invention preferably employs a permanent magnet to automatically measure the wall thickness of an article such as a bottle, using a set of positioning motors. The magnet generates a DC field which induces a response from a steel ball target positioned opposite to the magnet on the other side of the bottle wall. The response from the target depends on the wall thickness, which can then be determined. One disadvantage of this method is that the DC magnetic measurement is subject to errors due to the Earth's magnetic field and the intense low-frequency magnetic background noise present in many industrial environments. In addition, since the magnetic field is produced by a permanent magnet, the magnitude of the field changes with temperature. These errors limit the accuracy and precision of the thickness measurement, especially for thick samples.

A second type of magnetic thickness measurement uses the response of a magnetic target to an AC, or oscillatory, magnetic field. This technique has been applied to measure the thickness of nonmagnetic films, coatings, or sheets placed on top of a magnetic substrate that acts as the target. An example of this method is described in U.S. Pat. No. 5,770,949 to Sgro. Here a coil is placed on one side of the sample and a magnetic target is placed on the other side. An AC magnetic field is produced by passing an oscillatory current through the coil. This AC magnetic field is distorted by the magnetic permeability of the target and this field distortion changes the inductance of the coil. The thickness of the sample is then determined from the magnitude of the change in the coil inductance. Nix (U.S. Pat. No. 5,467,014) has also described a similar technique, known as the "magnetoinductive" technique, in which the magnetic response of the sample changes coil inductance.

Another variation of the AC magnetic thickness measurement uses the eddy current response from a metallic target. Here a coil generates an oscillatory, or AC, magnetic field that induces eddy currents in a metallic target on the opposite surface of the sample. The thickness of the sample is then determined by measuring the magnetic field produced by this eddy-current response. Most commonly, this technique has been used to measure the thickness of a film or coating on a conducting substrate. An example of this technique is described in U.S. Pat. No. 5,963,031 to de Halleux et al. Here an excitation coil supplies an AC magnetic field to a ferromagnetic, electrically conducting material covered with a non-ferromagnetic, electrically conducting coating. The response from the material and coating consists of a combination of the eddy current response from the magnetic material and that from the coating. This response is measured with a receive coil and used to determine the coating thickness.

Nix (U.S. Pat. No. 5,467,014) describes two probes as part of the same device. The first being a magnetoinductive probe to measure the thickness of film coatings on magnetic or ferromagnetic substrates and the second being an eddy current probe to measure the thickness of film coating on conducting, but non-magnetic, substrates. The two probes are necessary since they operate at different AC frequencies. Rather than have to rely on two probes, one would prefer to utilize the same probe for measurements at all frequencies.

In contrast with the DC-field method, these AC-field methods are not subject to errors due to the Earth's magnetic field. One disadvantage of these methods is that, when the sample itself is electrically conductive, the magnetic measurements will be affected by eddy currents induced in the sample. As described below, one would prefer to reduce this effect by reducing the frequency of the AC magnetic field.

Another disadvantage, shared by all of the methods described above, is that the magnetic sensor or detection coil is subjected to the applied AC or DC field, as well as the field due to the response of the target. In most cases, the target response is much smaller than the applied field, so that small drifts in the applied field, or in the gain of the sensor system, can produce large errors in measuring the target response.

The magnetic measurements described above are generally used to measure the thickness of nonmagnetic materials since magnetically permeable materials distort the applied magnetic field. However, in principle, one could calibrate the response from a section of a given magnetically permeable material to a DC or a very low frequency AC magnetic field, and use this information to determine the thickness of other sections of the same material.

A definite need exists for a system having an ability to provide rapid, accurate thickness measurement of materials. In particular, a need exists for a system which is capable of providing these measurements in a non-destructive manner. Ideally, such a system would have a lower cost and a higher sensitivity than conventional systems. A primary purpose of the present invention is to improve the capability of the magnetic thickness measurement technique using an accurate and versatile thickness measurement device.

SUMMARY OF THE INVENTION

An apparatus for and a method of measuring material thickness with magnetics is disclosed. The thickness monitoring system includes a thickness monitor, a probe, and a target. In a preferred embodiment, the probe is positioned on one side of an article for which the thickness is to be determined. The target is positioned on the opposite side of the article from the probe. The probe includes an excitation coil, a field compensation coil, and a magnetic sensor. The method includes energizing the excitation coil to excite a response from the target, compensating for the effect of the excitation coil on the magnetic sensor, measuring the response of the target with the magnetic sensor, and determining the thickness of the article from the measured response. The preferred mode of energizing the excitation coil is with an AC waveform; however DC, multi-frequency AC, or a combination of AC and DC waveforms may be used. Other preferred embodiments include:

(1) Omitting the excitation and field compensating coils and exciting the target by passing a current of AC, DC, or both through the target to generate a magnetic field at the sensor. In this preferred embodiment, the target is a strip of conductor or a conducting coil. The magnetic field generated by passing a current through the target is measured by the magnetic sensor on the opposite side of the sample. The sample thickness is then determined from the strength of the magnetic field at the sensor.

(2) Omitting the target and determining the sample thickness from the magnetic response of the sample itself.

(3) Using two or more excitation coils producing magnetic fields of differing spatial distribution.

(4) Using two or more magnetic sensors to detect the spatial distribution of the magnetic field generated by the target.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
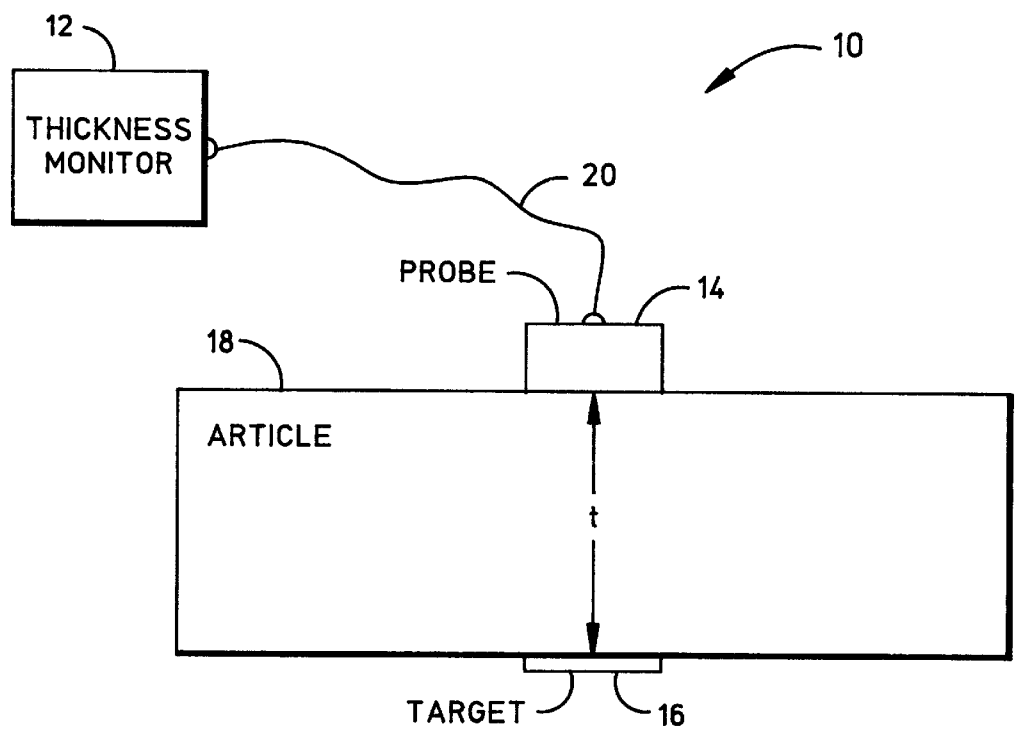
FIG. 1 is a block diagram of a thickness monitoring system according to the present invention including a thickness monitor, a probe, and a target.

Turning first to FIG. 1, a block diagram of a thickness monitoring system 10, including a thickness monitor 12, a probe 14, and a target 16, is shown. The system is shown measuring the thickness of an article 18. The article can be made of any non-magnetic material. The material can be of any shape. The shape shown has been simplified for demonstration purposes, but the principles disclosed within apply equally to more complex shapes, including but not limited to thickness of irregular articles, rods, disks, etc., and wall thicknesses of hollow rods and other hollow structures. The principle simplifications of the shape shown are that all of the sides are straight and that all of the corners are right angles so that the sides are parallel. This results in one vertical thickness labeled t.

In the preferred embodiment, the thickness monitor 12 and the probe 14 are discrete units connected by a cable bundle 20. This configuration allows for the easy placement and manipulation of the probe. However, it is also possible to combine the thickness monitor and the probe into one unit under certain circumstances if desired. It is preferred that the probe be a handheld unit, but it is also possible to attach the probe to a robotic arm for automated placement. Also in the preferred embodiment, the target is temporarily attached to the article using a removable adhesive. In practice, any method that holds the target in operational contact with the article during the measurement period is acceptable. One of ordinary skill in the art will realize that operational contact does not necessarily mean strict physical contact. It is preferred that the target be readily movable, but it would also be possible to fix the target and move the object instead. The use of a moveable target makes the system more portable, allowing one to measure objects that one does not want to or cannot move. Prior to measurement, the user places the probe and the target appropriately.

In general, the method includes generating an excitation waveform with the thickness monitor 12 and sending the waveform to the probe 14. This waveform energizes the probe to excite a response from the target 16. The target responds to the excitation. The magnitude of the response depends on the distance between the probe and the target. The probe in turn measures the magnitude of the response of the target and sends a response signal to the thickness monitor. Based at least in part on the response signal, the thickness monitor determines the thickness of the article and displays this to the user.

Figure 2A:
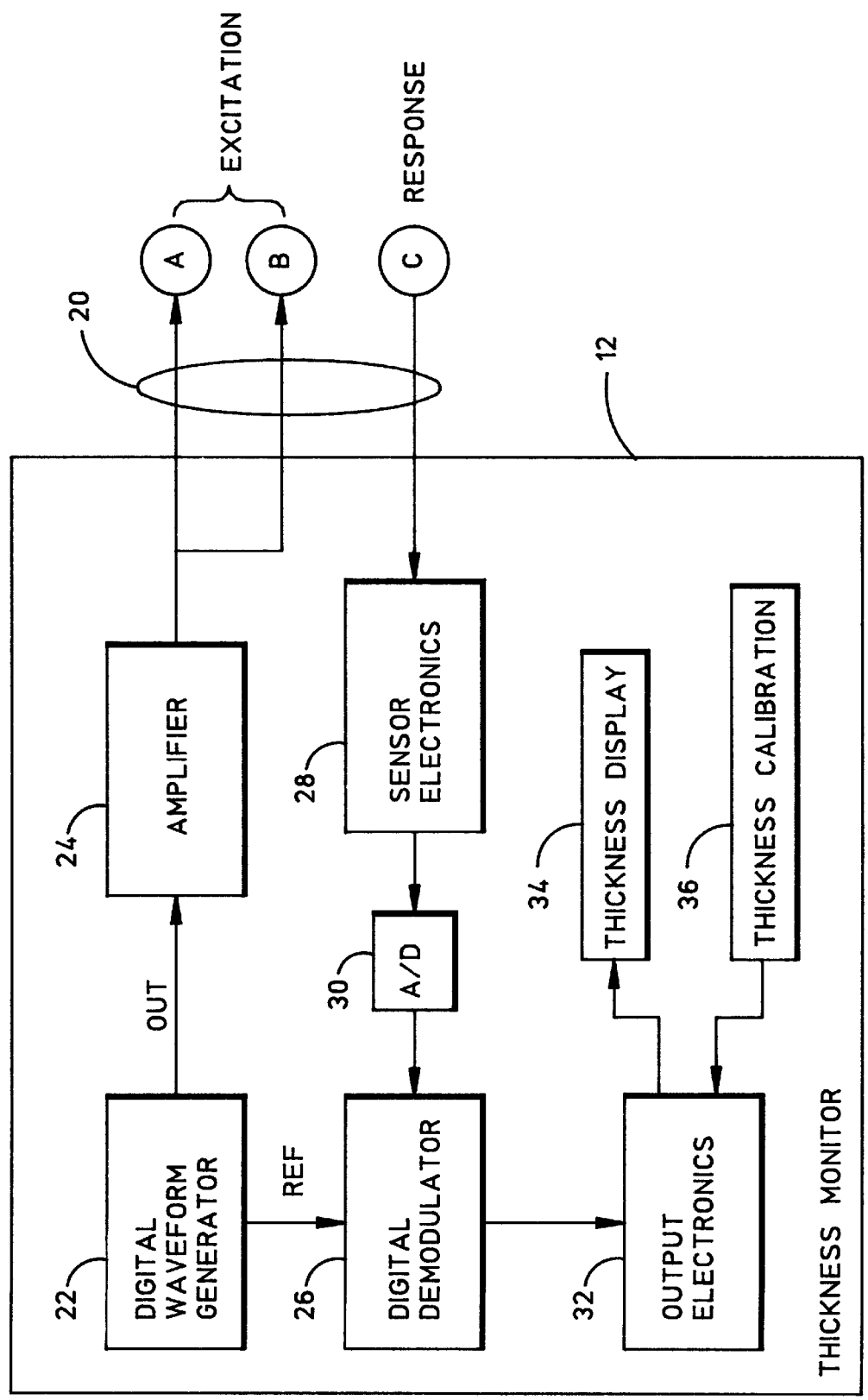
FIG. 2A is a block diagram of a preferred embodiment according to the present invention of the thickness monitor of FIG. 1.

With reference to FIG. 2A, a block diagram of a preferred embodiment according to the present invention of the thickness monitor 12 of FIG. 1 is shown. The thickness monitor includes a digital waveform generator 22 which generates the excitation waveform. In the preferred embodiment, the waveform is AC, but a DC waveform, some combination of the two, or a multifrequency AC waveform could be used in some embodiments. The excitation waveform is simultaneously transmitted through an output port (OUT) to an amplifier 24 and through a reference port (REF) to a digital demodulator 26. In an alternative embodiment, the digital demodulator may be substituted with a phase-sensitive detector. The amplifier amplifies the excitation waveform and transmits it through terminals (A) and (B) to the probe 14 of FIG. 2B, which will be discussed with more detail below. The probe returns a response signal through terminal (C), also to be discussed below, which is received by sensor electronics 28. The response signal is then converted from analog to digital by A/D converter 30 and transmitted to the digital demodulator. The digital demodulator then compares the reference excitation waveform to the digital response signal to determine the distance between the probe and the target 16 and hence the thickness of the article 18. The resulting thickness signal is transmitted to output electronics 32 which processes it for a thickness display 34 for communication to the user. The output electronics, in turn, receive a calibration signal from a thickness calibration 36 during set up prior to the taking of thickness measurements. The system 10 is calibrated using calibration samples having known thicknesses.

Figure 2B:
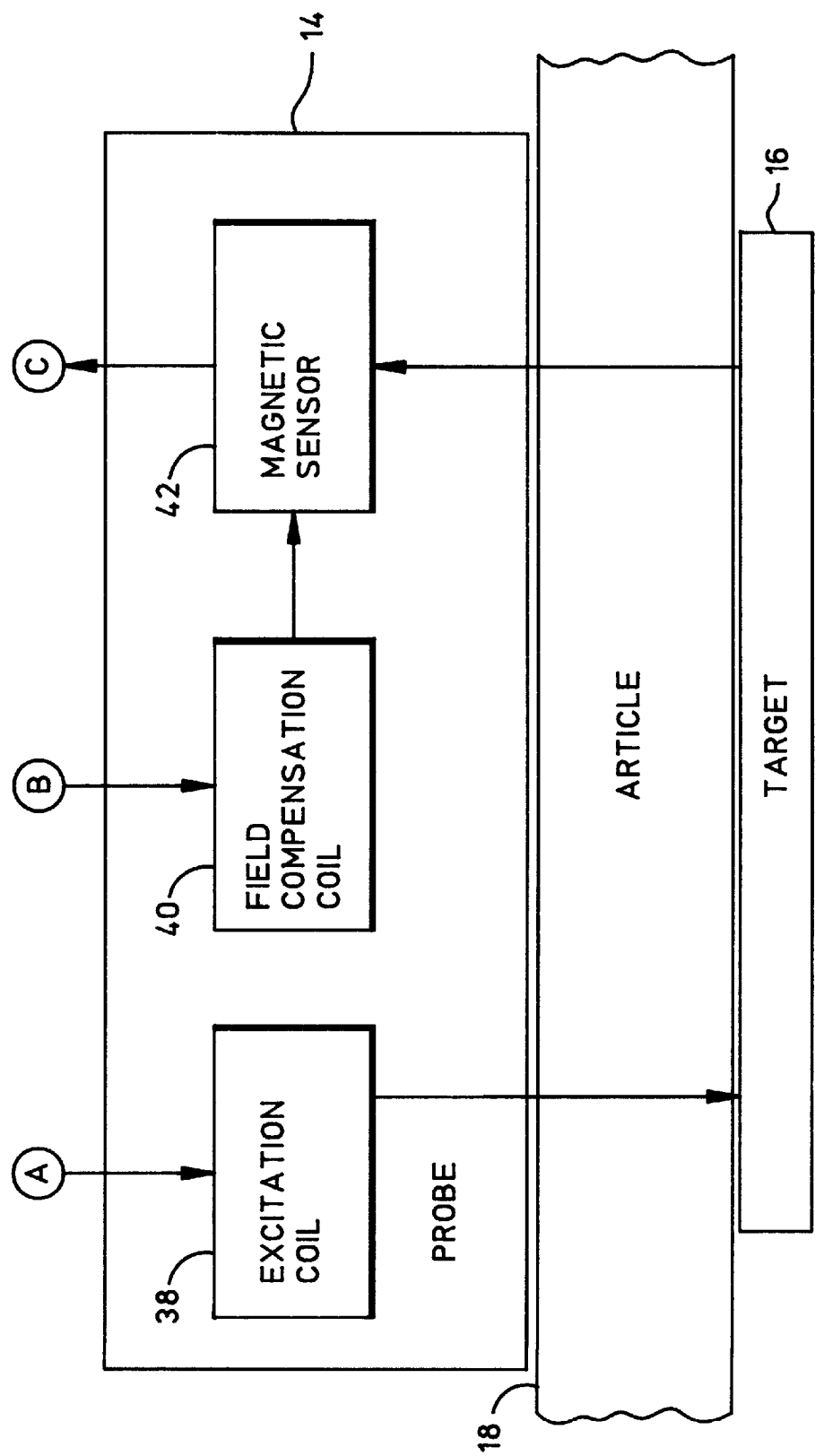
FIG. 2B is a block diagram of a preferred embodiment according to the present invention of the probe and the target of FIG. 1.

Turning now to FIG. 2B, a block diagram of a preferred embodiment according to the present invention of the probe 14 and the target 16 of FIG. 1 is shown. The probe includes an excitation coil 38, a field compensation coil 40, and a magnetic sensor 42. The amplified excitation waveform is received by both the excitation and field compensation coils of the probe from the thickness monitor 12 of FIG. 2A. The excitation coil generates an AC magnetic field that is preferably parallel to the surface of the article 18. Any suitable coil may be employed. The field generates an electromagnetic response from the target. The magnitude of the target response will depend on the distance from the excitation coil and will not depend on the shape or internal structure of the article so long as the article is non-magnetic. Preferably, the excitation coil will operate at very low frequencies, that is, a few Hertz or tens of Hertz. Excitation frequencies of about thirty to forty Hertz have been typically used. Low frequency excitation has the advantage of reducing the chance of inducing eddy currents in the article being measured. Eddy currents may create errors in the thickness measurement because of the distortion of the magnetic field caused by the eddy currents. In the presently preferred embodiment, the target is made of a magnetic material such as mu-metal, carbon steel, or ferrite because these tend to produce the largest response to a given applied field. It is important to note that the target can be made of a material that is a poor electrical conductor to all but eliminate any eddy current response in the target.

The magnitude of the electromagnetic response of the target 16 is measured by the magnetic sensor 42. The magnetic sensor could include an inductive coil, however the preferred embodiment includes a magnetoresistive (MR) sensor. The MR sensor exhibits higher sensitivity and smaller size than the inductive coil. The MR sensor is sensitive enough to allow the use of the very low frequency AC excitation coil discussed above. Further, the small size of the MR sensor allows one to get superior spatial resolution over the width of the object by comparison to the inductive coil detector. To further improve the sensitivity of the magnetic sensor, the field compensation coil 40 is employed in such a way as to cancel the excitation field at the sensor location. This means that the sensor is only measuring the response of the target. As a result, one can measure very small changes in the magnitude of the response of the target. This is especially important when thicker articles are being measured since the target response will be weaker for the same strength excitation field. In the presently preferred embodiment, the excitation coil 38 is made using one printed circuit board and the field compensation coil is made using another. The MR sensor is then mounted in between these boards, which are parallel to each other, where the applied field is mostly cancelled. Based on the response measured, the magnetic sensor generates the response signal which is transmitted to the thickness monitor 12 of FIG. 2A.

A second preferred embodiment of the present invention requires two modifications to the system 10. First, the passive target 16 is replaced with a conductor such as a straight wire or a coil to form a target excitation coil. Second, the excitation coil 38 and the field compensation coil 40 can be eliminated or at least disconnected. In this case, an AC current is passed through the target excitation coil and the resulting magnetic field is detected by the magnetic sensor 42. Since the target excitation coil is generating a magnetic field of its own, there is no need for the excitation field or the cancellation field. Otherwise, the system operates similarly to above. This preferred embodiment may be particularly useful in measuring thick articles.

It is important to note that this embodiment differs from conventional magnetic thickness gauges in which a permanent magnet and a magnetic sensor were placed on opposite sides of the sample. The present invention, by using a target excitation coil instead of a permanent magnet, makes possible the use of AC excitation, reducing errors due to the Earth's magnetic field and ambient magnetic noise. In addition, the geometry and dimensions of the target excitation coil can be varied in a very flexible manner, in order to optimize the spatial distribution of the magnetic field according to the thickness and shape of the article 18. In particular, the dimensions of the target excitation coil can be chosen so as to produce a magnetic field which falls off with distance at an optimal rate for measuring an article of a given thickness.

A third preferred embodiment uses two or more excitation coils 38, whose dimensions and geometry are chosen to produce magnetic fields of differing spatial distribution. For example, two excitation coils with different diameters may be used, producing magnetic fields that fall off with distance at different rates. The thickness of the article 18 may then be determined from the ratio of the magnetic signals measured using each of the two excitation coils. This method eliminates errors due to drifts in the magnetic field intensity or variations in the magnetic properties of the target 16. The differential measurement can be implemented by exciting the two coils successively and measuring the target response or by exciting the two coils simultaneously at two different frequencies and measuring the target response at the two frequencies.

In a fourth preferred embodiment, two or more magnetic sensors 42 may be used, combining the outputs of the sensors in different ways to measure quantities which have different dependencies on the distance from the sensors to the target 16. The thickness of the article 18 may then be determined from the ratios of these different measured quantities, in a manner independent of drifts in the magnetic field or the magnetic properties of the target. This method may be implemented in a number of ways. For example, two magnetic sensors, separated by a distance a, may be used. Where a is small compared with the thickness of the article t, the sum of the outputs of the two sensors will vary approximately as $1/t^3$, while the difference of the outputs of the two sensors will vary approximately as $a/t^4$. The ratio of these two quantities will then be approximately equal to t/a. In practice, a more accurate thickness measurement can be made by choosing a approximately equal to t. In this case, the mathematical expressions involved are somewhat more complicated, but the article thickness can still be determined from the ratio of the sum and difference measurements.

In a fifth preferred embodiment, the target 16 is eliminated and the thickness of the article 18 is determined from the magnetic or electromagnetic response of the article itself. This method may be implemented in a number of ways. For example, where the article is a magnetic material of known magnetic susceptibility, the thickness of the article may be determined from the magnitude of its magnetic-field response. Where both the thickness and the magnetic susceptibility of the article are unknown, measurements made using two or more different excitation coils or two or more configurations of magnetic sensors may be used to determine both the magnetic susceptibility and the thickness of the article.

To review, the five embodiments of the present invention outlined above provide one or more of the following five key features. First is the feature of the cancellation of the applied field at the sensor. With field cancellation, the magnetic sensor operates in a magnetic field close to zero, while at the same time a finite magnetic field is applied to the sample and the target. This approach greatly reduces errors due to drifts in the applied field or in the gain of the sensor system. In addition, the field cancellation allows one to use magnetic sensors that are more sensitive, but do not have the dynamic range to accommodate the full magnitude of the applied field. For example, with field cancellation, one can use highly sensitive magnetoresistive sensors instead of the Hall sensors used in some conventional systems.

Second is the feature of improved magnetic sensors. The present invention allows for the use of more advanced magnetic sensors, such as those based on magnetoresistance, giant magnetoresistance, or spin tunneling instead of the Hall sensors and inductive pickup coils used in conventional systems. The low noise of these new sensors improves the precision of the magnetic measurements, while their small size can improve the lateral resolution of a thickness measurement with respect to conventional techniques that use an induction coil. These new magnetic sensors also maintain their high sensitivity and low noise over a wide range of frequencies. This flexibility can be exploited in two important ways, as described below.

Third is the feature of low-frequency AC measurements. Unlike the coil sensors used in conventional systems, magnetoresistive sensors maintain high signal-to-noise ratios as the frequency of the magnetic measurement is reduced. By making AC measurements at lower frequencies, the present invention can reduce the eddy-current response of an electrically conductive sample. One can then make accurate thickness measurements of electrically conductive materials such as aluminum honeycomb.

Fourth is the feature of multiple-frequency capability. The new magnetic sensors provide high signal-to-noise ratios over a broad frequency range, extending essentially from zero frequency to one megahertz or more. This broad frequency range allows for the combination of the DC, AC magnetic, and AC eddy current techniques on a single probe. Such flexibility is not possible with induction coils whose sensitivity goes to zero at zero frequency.

Fifth is the feature of differential measurement technique. The present invention allows for a differential measurement using excitation from two different coils producing magnetic fields with different spatial distributions. If one measures the response of the target using each of the two coils, the ratio of the two measurements will be independent of the magnetic permeability of the target material, but will depend on the distance from the target to the sensor unit. One can then make a thickness measurement that is unaffected by changes in the magnetic properties of the target material. The differential measurement can be implemented by exciting the two coils successively and measuring the target response or by exciting the two coils simultaneously at two different frequencies and measuring the target response at the two frequencies. Alternatively, the differential measurement may be made using one excitation coil and two magnetic sensors positioned so as to measure the target response at two different spatial locations.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A system for measuring thickness of a material comprising:
   a thickness monitor for generating an excitation waveform, receiving a response signal, and determining the thickness of the material;
   a probe that is connected to the thickness monitor, the probe comprising an excitation coil, a field compensation coil, and a magnetic sensor, wherein the probe receives the excitation waveform with which the excitation coil generates an excitation field and the field compensation coil generates a cancellation field such that the cancellation field cancels the excitation field at the location of the magnetic sensor; and
   a target which is excited into exhibiting a response by the excitation field, wherein a magnitude of the response is measured by the magnetic sensor of the probe which in turn generates the response signal and transmits it to the thickness monitor, wherein the target has properties selected from the group consisting of electrical conductivity and poor electrical conductivity.

2. The system as defined in claim 1, wherein the thickness monitor further comprises:
   a digital waveform generator for generating the excitation waveform;
   sensor electronics for receiving the response signal from the probe;
   means for measuring the response signal and for comparing it to the excitation waveform; and
   output electronics for preparing a thickness determination for display.

3. The system as defined in claim 1, wherein the excitation waveform comprises an oscillating waveform which results in an oscillating magnetic field being generated by the excitation coil.

4. The system as defined in claim 3, wherein the excitation waveform further comprises a second oscillating waveform having a different frequency than a first oscillating waveform and resulting in a second oscillating magnetic field being generated by the excitation coil.

5. The system as defined in claim 3, wherein the means for measuring the response signal and for comparing it to the excitation waveform comprises a phase-sensitive detector for comparing the excitation waveform to the response signal.

6. The system as defined in claim 3, wherein the means for measuring the response signal and for comparing it to the excitation waveform comprises a digital d emodulator for comparing the excitation waveform to the response signal.

7. The system as defined in claim 3, wherein the excitation coil operates at very low frequencies.

8. The system as defined in claim 1, wherein the excitation waveform comprises a steady signal which results in a steady magnetic field being generated by the excitation coil.

9. The system as defined in claim 8, wherein the excitation waveform further comprises an oscillating waveform which results in an oscillating magnetic field also being generated by the excitation coil.

10. The system as defined in claim 1, wherein the probe may operate with any of an AC excitation waveform, a DC excitation waveform, and a combination of AC and DC.

11. The system as defined in claim 1, wherein the magnetic sensor measures an amplitude rather than a rate of change of the magnetic field.

12. The system as defined in claim 1, wherein the magnetic sensor comprises one or more sensor selected from the group comprising magnetoresistive sensors, giant magnetoresistance sensors, spin dependent tunneling sensors, fluxgate sensors, Hall effect sensors, and magnetoinductive sensors.

13. The system as defined in claim 1, wherein the magnetic sensor comprises at least one inductive pickup coil.

14. The system as defined in claim 1, wherein the target comprises an electrically conductive material.

15. The system as defined in claim 1, wherein the target comprises a magnetic material.

16. The system as defined in claim 1, wherein the target is configured as a thin sheet of material.

17. The system as defined in claim 1, wherein the target is configured as any of a disk, a disk with a hole, a strip, a film, a coating, and a tape.

18. The system as defined in claim 1, wherein the target is configured as any of a cylinder, a rod, a cone, a cuboid, a spheroid, and a hemispheroid.

19. A probe for a system for measuring a material thickness comprising a thickness monitor and a target, the probe comprising:
   an excitation coil for receiving an excitation waveform from the thickness monitor and generating an excitation field therewith;
   a field compensation coil for receiving the excitation waveform from the thickness monitor and generating a cancellation field therewith to cancel the excitation field at a predetermined location; and
   a magnetic sensor in the predetermined location for measuring a response magnitude of the target and transmitting a response signal to the thickness monitor.

20. The probe as defined in claim 19, further comprising at least a second excitation coil.

21. The probe as defined in claim 20, further comprising at least a second field compensation coil.

22. The probe as defined in claim 19, wherein:
   the excitation coil comprises a first planar surface; and
   the field compensation coil comprises a second planar surface;
   wherein the first and second planar surfaces are mounted parallel to one another and the magnetic sensor is located there inbetween.

23. The probe as defined in claim 19, wherein:
   the excitation coil comprises a first printed circuit board; and
   the field compensation coil comprises a second printed circuit board;
   wherein the first and second printed circuit boards are mounted parallel to one another and the magnetic sensor is located there inbetween.

24. The probe as defined in claim 19, wherein:
   the excitation coil and the field compensation coil are coaxial;
   the currents in the excitation and the field compensation coils are chosen so that the cancellation field nulls the excitation field in a region of space; and
   the magnetic sensor is located in the region where the magnetic fields are nulled.

25. The probe as defined in claim 19, wherein the excitation and field compensation coils are arranged such that the field at the magnetic sensor is nulled without significantly reducing the field at the target.

26. The probe as defined in claim 19, wherein the excitation coil generates an oscillating magnetic field.

27. The probe as defined in claim 26, wherein the excitation coil generates a second oscillating magnetic field having a different frequency than the first oscillating magnetic field.

28. The probe as defined in claim 19, wherein the excitation coil generates an oscillating magnetic field at very low frequencies.

29. The probe as defined in claim 19, wherein the excitation coil generates a steady magnetic field.

30. The probe as defined in claim 19, wherein the excitation coil generates any of an AC magnetic field, a DC magnetic field, and a combination of AC and DC.

31. The probe as defined in claim 19, wherein the magnetic sensor measures the amplitude rather than the rate of change of the magnetic field.

32. The probe as defined in claim 19, wherein the magnetic sensor comprises one or more sensor selected from the group comprising magnetoresistive sensors, giant magnetoresistance sensors, spin dependent tunneling sensors, fluxgate sensors, Hall effect sensors, and magnetoinductive sensors.

33. The probe as defined in claim 19, wherein the magnetic sensor comprises at least one inductive pickup coil.

34. A method of measuring material thickness utilizing a system comprising a thickness monitor, a probe, and a target, the method comprising the steps of:
   energizing an excitation coil in the probe to excite a response from the target;
   compensating for the effect of the excitation coil on a magnetic sensor of the probe by canceling the field gernerated at the location of the magnetic sensor;
   measuring the magnitude of the response of the target with the magnetic sensor; and
   determining the thickness of the material from the measured response.

35. A system for measuring thickness of a material comprising:
   a thickness monitor for generating an excitation waveform, receiving a response signal, and determining the thickness of the material; and
   a probe that is connected to the thickness monitor, the probe comprising an excitation coil, a field compensation coil, and a magnetic sensor,
   wherein the probe receives the excitation waveform with which the excitation coil generates an excitation field and the field compensation coil generates a cancellation field such that the cancellation field cancels the excitation field at the location of the magnetic sensor, the material is excited into exhibiting a response by the excitation field, and the magnitude of the response is measured by the magnetic sensor of the probe which in turn generates the response signal and transmits it to the thickness monitor.

36. The system as defined in claim 35, wherein the magnetic sensor comprises one or more sensor selected from the group comprising magnetoresistive sensors, giant magnetoresistance sensors, spin dependent tunneling sensors, fluxgate sensors, Hall effect sensors, magnetoinductive sensors, and any other sensor that measures the amplitude of the magnetic field rather than its rate of change.

37. The system as defined in claim 35, wherein the magnetic sensor comprises at least one inductive pickup coil.

38. A method of measuring material thickness utilizing a system comprising a thickness monitor and a probe, the method comprising the steps of:
   energizing an excitation coil in the probe to excite a response from the material, wherein the material has properties selected from the group consisting of electrical conductivity and poor electrical conductivity;
   compensating for the effect of the excitation coil on a magnetic sensor of the probe by cancelling the field generated at the location of the magnetic sensor;
   measuring the magnitude of the response of the material with the magnetic sensor; and
   determining the thickness of the material from the measured response.

* * * * *